March 1, 1966 B. H. PINCKAERS 3,238,390

BIDIRECTIONAL SWITCH WITH PARTICULAR SLAVE CONTROL MEANS INCLUDING PAIR OF SERIALLY-CONNECTED OPPOSITELY POLED DIODES

Filed Sept. 11, 1964

INVENTOR.
BALTHASAR H. PINCKAERS
BY Osmund R. Dahle
ATTORNEY

United States Patent Office 3,238,390

Patented Mar. 1, 1966

3,238,390

BIDIRECTIONAL SWITCH WITH PARTICULAR SLAVE CONTROL MEANS INCLUDING PAIR OF SERIALLY-CONNECTED OPPOSITELY POLED DIODES

Balthasar H. Pinckaers, Edina, Minn., assignor to Honeywell Inc., a corporation of Delaware Filed Sept. 11, 1964, Ser. No. 395,741

4 Claims. (Cl. 307—88.5)

This invention is concerned with control apparatus, and more particularly with a bidirectional switch capable of supplying A.C. power to a load, which switch utilizes a pair of controlled rectifying devices one of which is slaved to the other.

Figure 1:
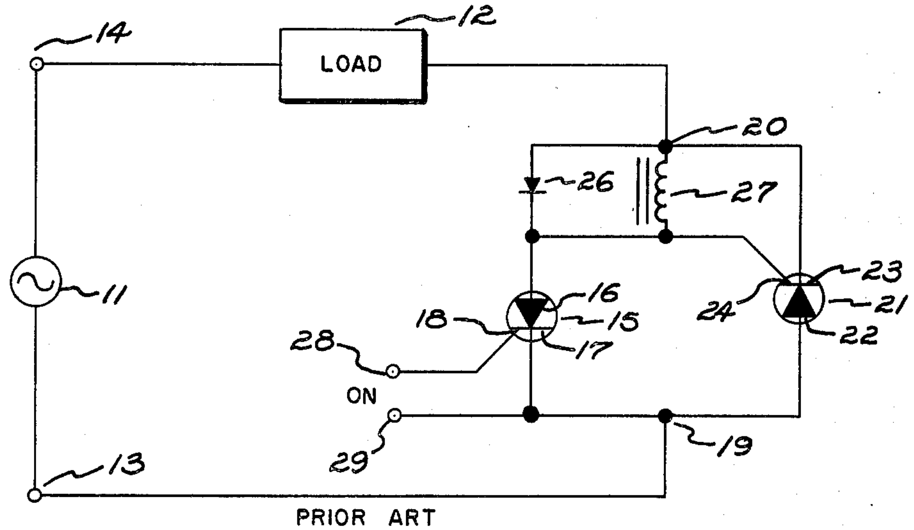
PRIOR ART FIG. 1

Of constantly increasing importance to the electrical control art is the substitution of electronic devices for mechanical devices, such as the substitution of semiconductor switches for mechanical switches. Numerous well known advantages can be gained by the use of semiconductive devices to replace mechanical devices subject to erosion and susceptible to unreliable operation after frequent use. It is now old in the art to use a pair of parallel-inverse connected (back to back) silicon controlled rectifiers to replace an A.C. switch. It is also well known that a control or "on" signal need only be presented to the control electrode or gate of one of the SCR's, and that the turn-on of the second SCR may be slaved to that of the first. An example of prior art accomplishing the slaving of one SCR to another is shown in FIGURE 1, of which the complete operation will be described below. A major disadvantage of the circuit of FIGURE 1 is the need for the diode 26 to be capable of carrying essentially the entire load current during the time that SCR 15 is on. This limitation can be quite costly in situations requiring high current to the load, as the power dissipation of the circuit is increased as much as 50%.

Figure 2:
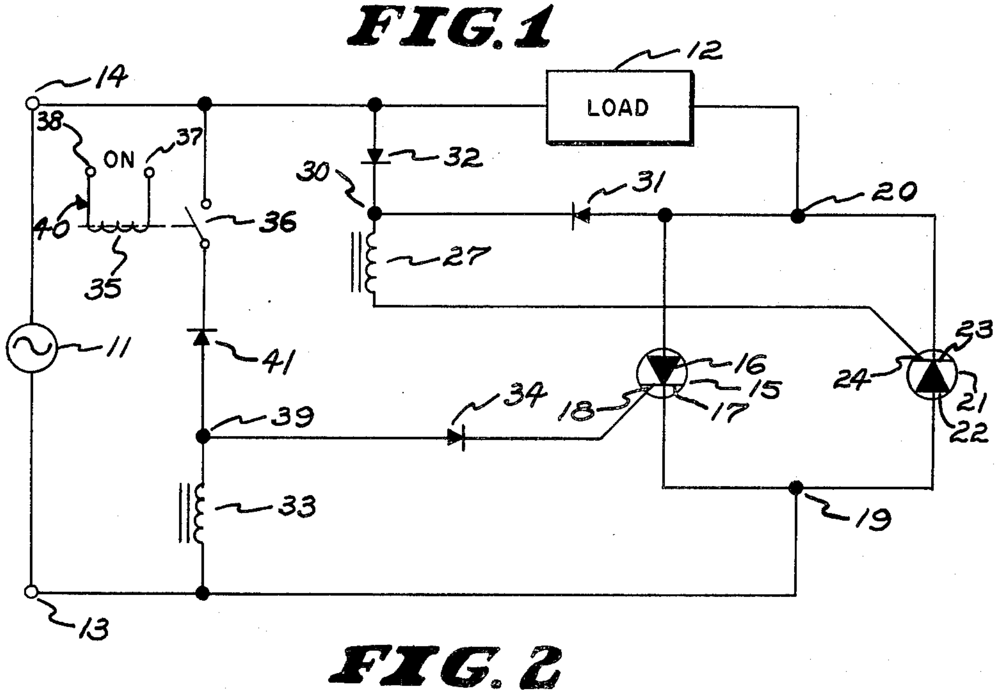

To overcome the disadvantage of the circuit of FIGURE 1 this invention proposes the unique combination disclosed in FIGURE 2, wherein the slaving of SCR 21 to SCR 15 is accomplished with a pair of oppositely poled diodes 31 an 32 neither of which is required to carry the main load current.

It is therefore an object of this invention to provide an electronic bidirectional switch capable of providing A.C. power to a load.

It is a further object of this invention to provide an inexpensive semiconductor high power A.C. switch.

It is a still further object of this invention to provide a bidirectional switch comprising a pair of parallel-inverse connected controlled rectifiers wherein the turn on of one rectifier is slaved to the other.

It is another object of this invention to provide an A.C. switch comprising a pair of parallel-inverse connected SCR's including an inexpensive circuit for accomplishing the slaving of the turn-on of one SCR to another.

It is still another object of this invention to provide a slaved pair of parallel-inverse connected SCR's having an automatic differential in the control circuit for the master SCR.

These and other objects of this invention will become apparent upon considering of the accompanying claims, specification, and drawings, of which:

FIGURE 1 is a schematic drawing of a prior art slaved A.C. switch utilizing a pair of parallel-inverse connected controlled rectifiers, and FIGURE 2 is a schematic drawing showing the slaved A.C. switch of this invention including a step-input control circuit for the master controlled rectifier.

Referring to FIGURE 1 there is disclosed a source of bidirectional energy here shown as A.C. supply 11, to which are connected a pair of terminals 13 and 14. A load 12 is connected between terminal 14 and a terminal 20. There are also disclosed a pair of controlled current carrying devices here shown as silicon controlled rectifiers 15 and 21. SCR 15 has an anode 16, a cathode 17 and a gate 18. SCR 21 has an anode 22, a cathode 23 and a gate 24. Cathode 23 is connected to terminal 20. Anode 22 is connected to a terminal 19. Terminal 19 is connected to terminal 13. An inductor 27 is connected between terminal 20 and gate 24. A diode 26 is connected between terminal 20 and anode 16. Anode 16 is also connected to gate 24. Cathode 17 is connected to terminal 19. Also connected to terminal 19 is an input terminal 29. Another input terminal 28 is connected to gate 18.

Referring now to FIGURE 2 there is again disclosed A.C. supply 11 having terminals 13 and 14. Load 12 is again connected between terminals 14 and 20. There is again disclosed SCR 15 having an anode 16, a cathode 17 and a gate 18, and SCR 21 having an anode 22, a cathode 23 and a gate 24. Cathode 23 is again connected to terminal 20 and anode 22 is again connected to terminal 19. Terminal 19 is again connected to terminal 13. A pair of diodes 31 and 32 are shown serially connected in opposing directions between terminals 14 and 20. An inductor 27 is connected from gate 24 to a terminal 30 between serially connected diodes 31 and 32. Anode 16 is connected to terminal 20. Cathode 17 is connected to terminal 19. There is also disclosed an input relay 40 having a coil 35 connected across a pair of input terminals 37 and 38, and having a normally open contact 36. Normally open contact 36 is connected between terminal 14 and a terminal 39. Another inductor 33 is connected between terminal 13 and terminal 39. A diode 34 is connected from terminal 39 to gate 18.

The operation of the circuit of FIGURE 1 may best be understood by first assuming that there is no input at terminals 28 and 29. It will be obvious that there can then be no current flow through either of SCR's 15 or 21 and thus no current flow through the load. Now assume that at a time when terminal 14 is positive with respect to terminal 13 in a turn-on input signal appears across terminals 28 and 29. The input signal will cause a turn-on current to flow from gate 18 to cathode 17 of SCR 15, which current when combined with the anode 16 to cathode 17 positive voltage drop, will cause SCR 15 to turn on. A current will flow from source 11, to terminal 14, through load 12, from terminal 20 through diode 26, from anode 16 to cathode 17 of SCR 15, and thence from terminal 19 to terminal 13 and back to source 11. Due to the voltage drop across diode 26 there will also be current flow from terminal 20, through inductor 27 to anode 16. This current flow through inductor 27 will cause energy to be stored in the magnetic field surrounding inductor 27. When the polarity of the A.C. supply 11 reverses, that is when terminal 13 becomes positive with respect to terminal 14, the reverse voltage drop from cathode 17 to anode 16 will cause SCR 15 to turn off. As a result the magnetic field around inductor 27 will collapse, causing a current flow from gate 24 to cathode 23 of SCR 21 and back to terminal 20. The decay time of this discharge of energy from inductor 27 is sufficiently long to allow the now forward biased SCR 21 to turn on, which will then cause current flow from source 11 to terminal 13, to terminal 19, from anode 22 to cathode 23 of SCR 21, from terminal 20 through load 12, then to terminal 14 and back to the other side of source 11. It can thus be seen that a single input signal to one SCR has accomplished the turn-on of both SCR's through the expedient of storing a charge to be used as a turn-on signal for the other SCR. It can also be seen that to accomplish the slaving of SCR 21 to SCR 15 this prior art circuit requires that essentially full load current must flow through the diode 26 when SCR 15 is on. This high current demands the use of a high current diode for diode 26, and causes a considerable increase in dissipation.

The operation of the circuit of FIGURE 2, which is an embodiment of this invention, may best be understood by first assuming that there is no input to relay 40 and that therefore neither SCR 14 to SCR 21 is on, and there is therefore no load current. Assuming now that an input appears at terminal 37 and 38 to actuate relay 40 by causing a current flow in coil 35. This will cause normally open contact 36 to close. Due to the diode 41 no current will begin to flow to inductor 33 until the polarity of A.C. supply 11 is such that terminal 13 is positive with respect to terminal 14, at which time a current will flow from terminal 13 through inductor 33, through diode 41 and contact 36 to terminal 14. This current flow will cause inductor 33 to store energy in a magnetic field surrounding the inductor 33. When supply 11 reverses polarity and terminal 14 becomes positive with respect to terminal 13, the magnetic field around inductor 33 will collapse to cause a current flow from inductor 33 through terminal 39, through diode 34, from gate 18 to cathode 17 of SCR 15, and from terminal 19 back to the other side of inductor 33. Due to this positive gate current and the then prevailing forward voltage drop from anode 16 to cathode 17, SCR 15 will turn on. There will then be a current flow from supply 11 to terminal 14, through load 12 to terminal 20, from anode 16 to cathode 17, from terminal 19 to terminal 13 and back to supply 11. There will also be a current flow from terminal 14 through diode 32 to terminal 30, from terminal 30 through inductor 27, then from gate 24 to cathode 23 of SCR 21, to terminal 20, from anode 16 to cathode 17 of SCR 15, from terminal 19 to terminal 13 and back to supply 11. This latter current will be relatively small due to the impedance of inductor 27. There will be sufficient current, however, to store enough energy in the form of a magnetic field around inductor 27, which energy when discharged will be sufficient to turn-on SCR 21.

Assume now that supply 11 once more reverses and thus terminal 13 again becomes positive with respect to terminal 14. If the input signal to relay 40 is still present, the inductor 33 will again take on sufficient charge for a future turn-on of SCR 15. Also, the reverse voltage from cathode 17 to anode 16 will now cause SCR 15 to turn off. The turn off of SCR 15 will in turn stop the flow of current through inductor 27. Therefore, inductor 27 will discharge its stored energy in the form of current flow from gate 24 to cathode 23 of SCR 21, to terminal 20, and then through diode 31 back to the other side of inductor 27. This positive gate current combined with the then prevailing positive voltage drop from anode 22 to cathode 23 will cause SCR 21 to turn on, and there will therefore be a current flow from supply 11 to terminal 13, to terminal 19, from anode 22 to cathode 23 of SCR 21, to terminal 20, through load 12 to terminal 14 and back to the other side of supply 11.

It is important to note that though it has been shown that SCR 21 is again slaved to SCR 15 by the circuit of this invention as shown in FIGURE 2, that neither diode 31 nor diode 32 carries the load current, and that actually neither diode 31 nor diode 32 had to carry more than sufficient gate current to turn on SCR 21. Therefore, it is obvious that a more efficient means of providing the slaving has been accomplished. It should also be noted that, as previously mentioned, as long as there is an input signal on terminals 37 and 38, contact 36 will remain closed and the switch will remain on. A differential effect will be seen through the use of the relay coil 35, wherein the input signal required to initially close contact 36 may be reduced considerably before contact 36 will open, to thus create on automatic differential for this entire circuit.

It will be obvious that the general principles herein disclosed may be embodied in many other forms other than that specifically illustrated, without departing from the spirit of the invention as defined in the following claims.

What is claimed is:

1. A slaved switch comprising:
a source of bidirectional energy having first and second terminals;
first and second unidirectional current carrying devices having, respectively, first and second control electrodes;
means connecting said first and second devices in parallel-inverse relation;
load means;
means connecting said load means and said parallel-inverse connected devices serially between said first and second terminals;
control means connected to said first control electrode;
first and second current rectifiers serially connected in opposing relation from said second terminal to a point between said load means and said parallel-inverse connected devices;
and energy storage means connected from a point between said current rectifiers to said second control electrode, so that said energy storage means will charge only when said first current carrying device is on, and so that said second current carrying device is turned on only by the discharge of said energy storage means.

2. A slaved bidirectional switch comprising:
a source of energy having first and second terminals;
a pair of unidirectional current controlling devices connected in parallel-inverse relation;
load means;
means connecting said load means and said parallel-inverse connected devices serially between said first and second terminals;
control means connected to a control electrode on one of said pair of devices;
a first diode and an inductor serially connected from a point between said load means and said parallel-inverse connected devices to a control electrode on the other of said devices;
and a second diode connected from said second terminal to a point between said first diode and said inductor, said first and second diodes poled so that current can flow from said source of energy through said inductor only when said one of said devices is on.

3. A bidirectional switch comprising:
a pair of controlled rectifiers each having an input, output and control electrode;
means connecting said input and output electrodes so that said pair of controlled rectifiers are connected in a parallel-inverse circuit;
first and second terminals adapted to be connected to a source of bidirectional energy;
means connecting one end of said parallel-inverse circuit to said first terminal;
a pair of oppositely poled rectifiers serially connected between said second terminal and the other end of said parallel-inverse circuit;
energy storage means connected from a point between said oppositely poled rectifiers to a control electrode on one of said pair of controlled rectifiers;
a third terminal connected to said other end of said parallel-inverse circuit;
load means connected between said second and third terminals;
and control means connected to a control electrode on the other of said pair of controlled rectifiers.

4. A slaved solid state bidirectional switch comprising:
first and second controlled rectifiers each having anode, cathode and gate electrodes;
first, second and third terminals; said first and second terminals adapted to be connected across a source of bidirectional energy, said second and third terminals adapted to be connected across a load;
means connecting said first controlled rectifier anode electrode and said second controlled rectifier cathode electrode to said third terminal;
means connecting said first controlled rectifier cathode electrode and said second controlled rectifier anode electrode to said first terminal;
a pair of oppositely poled diodes serially connected between said second terminal and said third terminal;
an inductor connected from a point between said pair of diodes to said second controlled rectifier gate electrode;
and control means connected to said first controlled rectifier gate electrode.

No references cited.

ARTHUR GAUSS, *Primary Examiner.*

J. ZAZWORSKY, *Assistant Examiner.*